June 4, 1963

S. L. HENRY 3,091,846

METHOD OF BRAZING

Filed March 21, 1958

INVENTOR.
SCOTT L. HENRY

BY

Andrus & Starke

ATTORNEYS

United States Patent Office 3,091,846
Patented June 4, 1963

3,091,846
METHOD OF BRAZING
Scott L. Henry, Milwaukee, Wis., assignor to A. O. Smith Corporation, Milwaukee, Wis., a corporation of New York
Filed Mar. 21, 1958, Ser. No. 722,937
2 Claims. (Cl. 29—471.5)

This invention relates to a method of brazing and more particularly to a method of brazing skin sheets to a cellular core.

Where it is desired to have a structure capable of withstanding relatively high temperatures and still be lightweight and strong in construction, a structural material comprised of a cellular stainless steel core having stainless steel skin sheets brazed to each face thereof has proven successful. Specifically in the field of aeronautics, the need for such a high temperature structure material is becoming increasingly important due to the relatively recent advent of supersonic aircraft and the continuous development of increasingly faster aircraft. At the tremendous speeds of supersonic flight the aircraft must not only be stronger than heretofore necessary but also resistant to the high temperatures resulting from friction between the air and the outer surfaces of the aircraft. Conventional fabricating materials such as aluminum, and the like have proven to be unsatisfactory at these highly elevated temperatures.

However, use of the cellular structure of the type described, as a fabricating material has been somewhat limited by the present methods of brazing the skin sheets to the cellular core inasmuch as the methods involve expensive and bulky equipment to hold the skin sheets tightly and uniformly against the core during the brazing process. Furthermore, these methods entail prolonged brazing periods which may have a deleterious effect on the structural strength of the material. In general, present methods of brazing involve forming a sandwich by placing a cellular core, of the proper thickness, between two metal skin sheets, with a sheet of brazing material between each skin and the core. The sandwich is then placed in a furnace between graphite or ceramic fixtures which are heated to accomplish the braze. The fixtures, besides serving as heat transfer walls, maintain the skins and brazing material in firm engagement with the core and prevent distortion of the sandwich during cooling. Thus, the fixtures must necessarily be quite heavy and bulky in nature, making them quite expensive. Furthermore, since these fixtures have a high heat absorbing capacity a long period of time is required to heat them to the proper temperature for brazing and a correspondingly long period of time is required for the fixtures to cool to the proper temperature. This long period during which the sandwich is at or near the brazing temperature may cause the brazing material to penetrate the skins and substantially reduce the mechanical properties of the skins.

The method of the invention accomplishes the braze with relatively simple but effective means for holding the skins to the core during the brazing process and further, employs a relatively short heating period resulting in a negligible loss of the mechanical properties of the structure.

According to the invention, a sandwich is formed by placing a cellular metal core, having adjacent cells interconnected by internal passageways, between a pair of metal skins. A suitable brazing material is interposed between each skin and the core. The edges of the sandwich are then sealed by appropriate means and a difference in pressure between the interior and exterior of the sandwich is maintained. The pressure differential is maintained throughout the process and serves to hold the skins and the brazing material tightly against the core to insure a good braze. The sandwich is then placed in a furnace and heated to brazing temperature. During heating an atmosphere is established within the sandwich and either an atmosphere or a protective covering is provided for the outer surfaces of the sandwich to prevent oxidation of the inner and outer sandwich surfaces.

After heating, the sandwich is removed from the furnace and placed between suitable dies where it is allowed to cool to the desired temperature.

Accordingly it may be stated that an object of this invention is to provide a method of brazing skins to a cellular core that is relatively fast, inexpensive and effective.

Another object of this invention is to eliminate the need for heavy bulky fixtures to hold the skins to the core during the brazing process.

A further object of this invention is to prevent oxidation of the skins and the core during the brazing process.

A further object of this invention is to eliminate irregularities on the surfaces of the skin sheets which tend to form during the brazing process.

A further object of the invention is to prevent warping of the sandwich as the sandwich is cooled.

Further objects of the invention will appear in the course of the following description.

The drawing illustrates the best mode presently contemplated of carrying out the invention.

Figure 1:
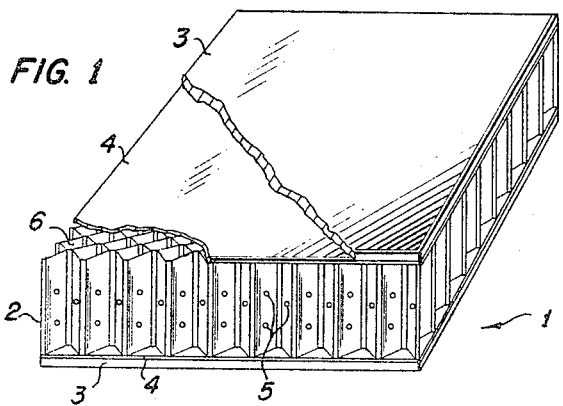
FIGURE 1 is a perspective view of the sandwich with parts broken away and sectioned.

In the drawing, the sandwich structure 1 fabricated according to the method of the invention consists of a cellular core 2 and a pair of skins 3 suitably bonded to core 2 by a brazing material 4 initially applied in sheet or foil form as shown in FIG. 1. The cellular core 2 is composed of a metal such as stainless steel and consists of a series of thin-walled cells communicating with each other by means of openings 5 provided in the walls 6 of each cell.

The sandwich 1 is assembled by placing a pair of skins 3 on either side of core 2 with the brazing material 4 in the form of thin sheets interposed between the skins 3 and the core 2. The skins 3 may be made of stainless steel or other corresponding material which have been cleaned and otherwise treated to present the proper surfaces for bonding. A typical brazing material 4 for use with a stainless steel core 2 and stainless steel skins 3, comprises an alloy having a composition by weight of approximately 94.5% silver, 5% copper and 0.5% lithium.

The skins may be applied as flat sheets to a core of uniform thickness, as shown in FIG. 1 or in the event it is desired to fabricate a curved structural sandwich, such as is often required to be used as aircraft structural components, the sheets may be contoured prior to application to a like contoured core. Such a contoured core may be of non-uniform thickness as well as one of uniform thickness, or a combination of both.

The skins 3 are secured, by tack welding or other suitable means, to the core 2 to prevent relative movement therebetween. The sandwich 1 is then placed within a flexible envelope 7 of heat-resistant alloy, such as stainless steel, so as to be completely enclosed therein with the adjacent surfaces of the envelope 7 and skins 3 being in intimate contact. The periphery of envelope 7 is then welded to form an air tight enclosure.

Air is withdrawn from the envelope 7 and from within the cellular core 2 through the interconnecting openings 5 in the cell walls by means of an exhaust conduit 8 which is secured by welding within a suitable opening in envelope 7 and which is connected to a vacuum pump, not shown. A suitable gas to prevent or minimize oxidation of the surfaces to be bonded is then introduced into the envelope through an inlet conduit 9 which is also secured within a suitable opening in envelope 7. Typical gases which might be used include an inert gas, such as argon or helium or a mild oxidizing gas, such as carbon dioxide. In some cases, particularly where the brazing material does not contain lithium, a reducing gas, such as hydrogen, may be used. The term "substantially non-oxidizing" will be used to describe generally the gas to be used in the method of the invention.

Alternate withdrawal of gas or air from envelope 7 through conduit 8 and introduction of gas through conduit 9 is repeated until a substantially non-oxidizing atmosphere is established within envelope 7. At the same time, a partial vacuum is established within envelope 7. The vacuum pump continues to operate and the bleeding of gas into the envelope through conduit 9 also continues in order to flush out any gases involved from the the metals during subsequent heating and cooling steps of the process.

The partial evacuation of the interior of the cellular core causes atmospheric pressure to force the flexible envelope against the skin sheets to thereby force the skin sheets and the brazing material tightly and uniformly against the core. In this manner, intimate contact between the components of the sandwich is insured during the subsequent brazing step. A partial vacuum is established within the sandwich as the cellular core would collapse under the influence of a complete vacuum at the elevated temperatures employed to melt the brazing material.

The exact degree of evacuation is dependent upon the particular brazing temperature utilized as well as the composition of the cellular core, the height of the core, the number of cells present in a given area and the thickness of the cell walls. By varying one or more of these elements, a relatively wide range is produced in the degree of evacuation. For example, a substantially complete vacuum could be used in a situation where the height of the core is exceedingly small since in such a situation, the core would tend to act as a flat plate-like member rather than as a series of thin columns. On the other hand by increasing the height of the core, the individual cell walls would tend to act as long, thin columns and only a small vacuum could be used. In any case, a differential pressure of at least 1 to 2 inches of mercury between the exterior and interior of the envelope is required to hold the components of the sandwich firmly together.

A sandwich consisting of a pair of stainless steel skins each having a thickness within the range of .010 to .050", and a stainless steel core having a height of 1", a cell wall thickness of 2/1000", and a distance between opposite cell walls of ¼", was fabricated according to the method of the invention. At a brazing temperature approximating 1735° F., a differential pressure of 5 inches of mercury proved satisfactory.

Rather than enclose the sandwich 1 within an envelope as a means of establishing an enclosed space within the sandwich suitable for evacuation, the peripheral edges of the sandwich may be sealed in a number of ways and the sandwich exhausted by means of a conduit communicating with the interior of the core. Such a seal might be provided by closing the openings 5 in the outer cellular walls 6 or by extending a flexible strip of material completely around the sides and end portions of the sandwich and then welding, in the event a metal strip is used, or otherwise securing the strip to the upper and lower skin sheets. The envelope 7 is advantageous inasmuch as it also serves to protect the outer surfaces of the skins from oxidation during the brazing process whereas in these latter mentioned methods of sealing the sandwich, a suitable atmosphere or other protective covering would be required around the sandwich to prevent oxidation of the outer skin surfaces.

Figure 2:
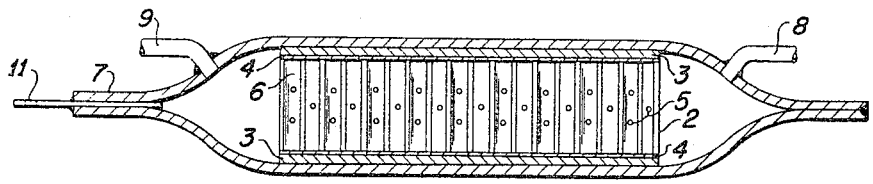
FIG. 2 is a side elevational view in section showing the sandwich enclosed within the envelope.

With the envelope 7 partially evacuated and the skins 3 and brazing material 4 held firmly against core 2, the envelope is suitably hung within a furnace 10. To this end, one end of the envelope is provided with a metal support plate 11 which is adapted to receive a hook 12 depending from the top of the furnace. Support plate 11 is secured by welding to the envelope in the manner shown in FIG. 2. The furnace is brought to brazing temperature prior to insertion of the envelope and maintained at such temperature by the electric heating elements 13.

After a relatively short heating period during which the components of the assembly are allowed to reach the brazing temperature, the assembly is removed from the furnace. A heating period of ten minutes within the furnace maintained at a temperature between 1735° F. to 1750° F. is required for the particular brazing material hereinbefore described in combination with the particular stainless steel skins and core used. After removal from the furnace, the assembly is placed within dies 14 and 15 and cooled to the desired temperature.

A series of spaced plates 16 are disposed on the periphery of die 14 and are adapted to limit the movement of dies 14 and 15 relatively toward each other. The plates 16 extend outwardly from die 14 toward die 15 a distance slightly greater than the overall thickness of envelope 7. As the dies are closed upon the envelope, plates 16 initially contact die 15 and prevent further inward movement thereof to thereby provide a nominal clearance between the dies and the envelope. In actual practice the clearance is dependent upon the tolerances required in the dimensions of the completed sandwich and, in the sandwiches fabricated according to the invention, the tolerances ranged from .003" to .010". Such a clearance prevents the application of an excessive amount of pressure to the envelope to insure that the thin skin sheets will not be cut or otherwise damaged by the cellular core edges.

However, the dies, which for all practical purposes are in contact throughout the assembly, resist any tendency of the envelope to warp or distort during the cooling period and insure that the contour of the envelope will conform to that of the dies. The connections to the exhaust and inlet conduits 8 and 9 extend through the spaces between pltaes 16 to the vacuum pump, not shown, and to the source of gas, not shown, respectively.

In the event precise control over the movement of the dies is possible, plates 16 are not required to limit the inward movement of the dies. In such a case, the dies are moved into contact with envelope 7 but do not apply any appreciable amount of pressure thereto.

Figure 4:
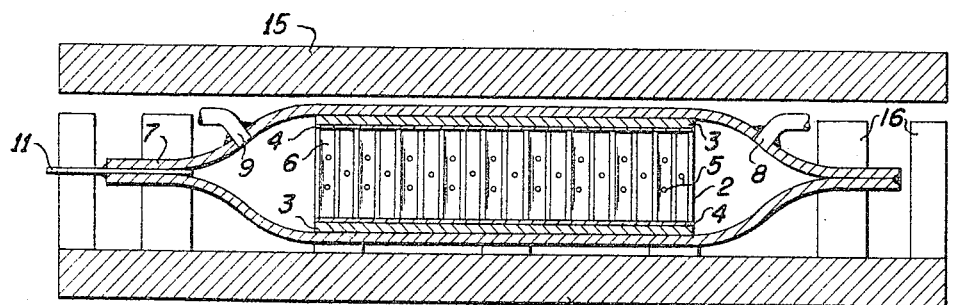
FIG. 4 is a side elevational showing the assembly after removal from the furnace and disposed between appropriate dies.
Figure 3:
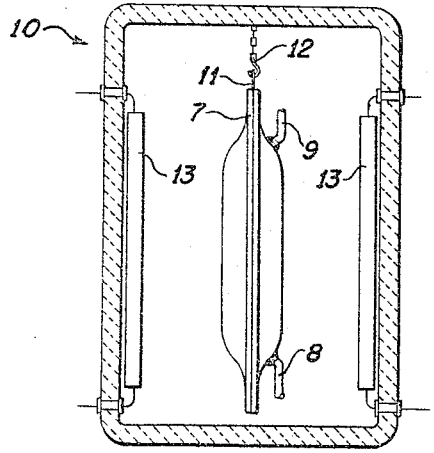
FIG. 3 is a vertical section of a furnace showing the sandwich being heated to a temperature sufficient to melt the braze material.

As shown in FIG. 4, the dies are flat in nature but in the event the skins and core were assembled with a contoured shape, the dies are provided with a like contour. The dies serve the further purpose of eliminating wrinkles and/or bellies which may have formed in the sandwich during the brazing process.

After the brazing material has solidified, the vacuum may be discontinued and after heat treatment of the sandwich is accomplished, the envelope may be removed. The sandwich is now ready for use as desired.

By partially exhausting the interior of the envelope, the skins 3 are held tightly and uniformly against the cellular core 2 without the need for heavy and expensive fixtures heretofore used for this purpose. The elimination of these fixtures which have a relatively high heat absorbing capacity enables the sandwich to be heated for a relatively short period to accomplish the braze, thereby decreasing the possibility of penetration of the skins by the brazing alloy which as an injurious effect on the strength of the sandwich. Furthermore, the atmosphere which is maintained within the sandwich prevents oxidation therein during the brazing process. Oxidation of the outer surfaces of the sandwich is prevented by the enclosing envelope 7 which is later discarded or by a suitable atmosphere maintained in the furnace.

Various modes of carrying out the invention are contemplated as being within the scope of the following claims particularly pointing out and distinctly claiming the subject matter which is regarded as the invention.

I claim:

1. In the method of brazing metal skin sheets to a cellular core having communication between adjacent cells of said core, the steps comprising applying a layer of brazing material to each face of said core, applying a skin sheet to each layer of brazing material to form a sandwich, enclosing said sandwich in a flexible envelope with the envelope being disposed in intimate contact with said skin sheets, sealing said envelope, establishing a substantially non-oxidizing atmosphere within said envelope to prevent oxidation of the enclosed sandwich, establishing a partial vacuum within said envelope whereby said envelope is forced against said skin sheets to thereby hold the components of said sandwich firmly and intimately together, heating said envelope to a temperature sufficient to melt said brazing material while maintaining said vacuum, cooling said envelope to solidify the melted brazing material and bond said skin sheets to said core while maintaining said vacuum, and locating said envelope between a pair of dies spaced from one another a distance which is from .003 inch to .010 inch greater than the overall thickness of the envelope during the cooling period to prevent warping and distorting of the envelope during cooling while simultaneously preventing the development of excessively high die pressures on the envelope.

2. In the method of brazing metal skin sheets to a cellular metal core having communication between adjacent cells of said core, the steps comprising forming a sandwich by placing a skin sheet on each face of said core with a layer of brazing material disposed between the core and each sheet, sealing the peripheral edges of said sandwich, alternately introducing a substantially non-oxidizing gas into said sandwich and withdrawing the same with the final withdrawal of gas serving to provide a vacuum within said sandwich whereby the components of said sandwich are forced firmly and uniformly together, heating said sandwich to a temperature sufficient to melt said brazing material, cooling said sandwich to allow solidification of the melted brazing material to bond said skin sheets to said core with said vacuum being maintained during said heating and cooling, and locating said sandwich between a pair of dies conforming to the contour of the sandwich and spaced apart a distance which is from .003 inch to .010 inch greater than the thickness of the sandwich during the cooling period to prevent warping and distorting of the sandwich during cooling while preventing excessively high die pressures on same.

References Cited in the file of this patent

UNITED STATES PATENTS

| | | |
|---|---|---|
| 1,247,250 | Field | Nov. 20, 1917 |
| 2,093,814 | Mann | Sept. 21, 1937 |
| 2,337,007 | Vidal et al. | Dec. 14, 1943 |
| 2,609,068 | Pajak | Sept. 2, 1952 |
| 2,614,517 | Peterson | Oct. 21, 1952 |
| 2,636,539 | Pajak | Apr. 28, 1953 |
| 2,686,552 | Faeber et al. | Aug. 17, 1954 |
| 2,686,957 | Koerper | Aug. 24, 1954 |
| 2,693,636 | Simpelaar | Nov. 9, 1954 |
| 2,700,632 | Ackerlind | Jan. 25, 1955 |
| 2,713,196 | Brown | July 19, 1955 |
| 2,722,735 | Beamish | Nov. 8, 1955 |
| 2,816,355 | Herman | Dec. 17, 1957 |
| 2,845,698 | Giovannucci et al. | Aug. 5, 1958 |
| 2,978,806 | Herbert | Apr. 11, 1961 |